United States Patent [19]

Kobetsky

[11] 4,139,408
[45] Feb. 13, 1979

[54] ADHESIVE FASTENER ARTICLE
[75] Inventor: Robert G. Kobetsky, Chicago, Ill.
[73] Assignee: Illinois Tool Works Inc., Chicago, Ill.
[21] Appl. No.: 837,063
[22] Filed: Sep. 28, 1977
[51] Int. Cl.² ................. B32B 19/02; B23K 13/02
[52] U.S. Cl. ................. 156/380; 24/73 VA; 24/DIG. 11; 219/10.53
[58] Field of Search ................. 156/380, 272; 219/10.49, 10.53, 10.57; 24/73 VA, DIG. 11

[56] References Cited
U.S. PATENT DOCUMENTS

| | | | |
|---|---|---|---|
| 3,641,281 | 2/1972 | Varadi et al. | 179/100.2 C |
| 3,836,744 | 9/1974 | Taketo et al. | 219/10.49 |
| 3,883,712 | 5/1975 | McBriarty | 219/10.79 |

*Primary Examiner*—Douglas J. Drummond
*Attorney, Agent, or Firm*—Thomas W. Buckman; Robert W. Beart

[57] ABSTRACT

This invention relates generally to an adhesive fastening device which includes a substantially flat base carrying on its undersurface a layer of heat activable adhesive. The fastening device may also include a section extending from the base designed as a secondary fastening feature, such as a stud, tab, clip or the like. Protuberances of limited surface area and height are formed adjacent the perimeter of the base in a pair of laterally spaced lines adapted to be associated with the end surfaces of a U-shaped core to slightly space the core from the base.

6 Claims, 8 Drawing Figures

U.S. Patent  Feb. 13, 1979  4,139,408
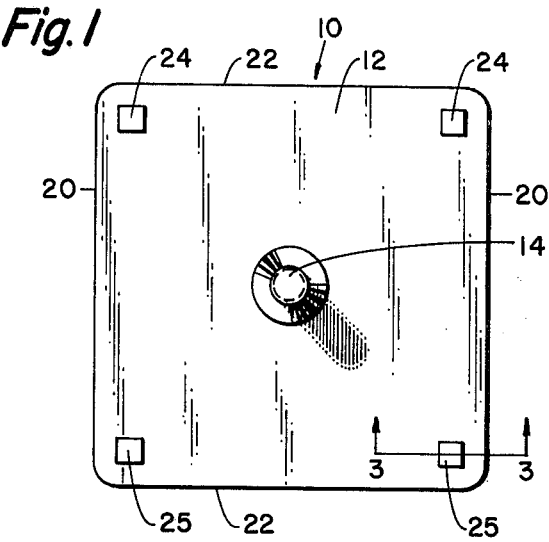
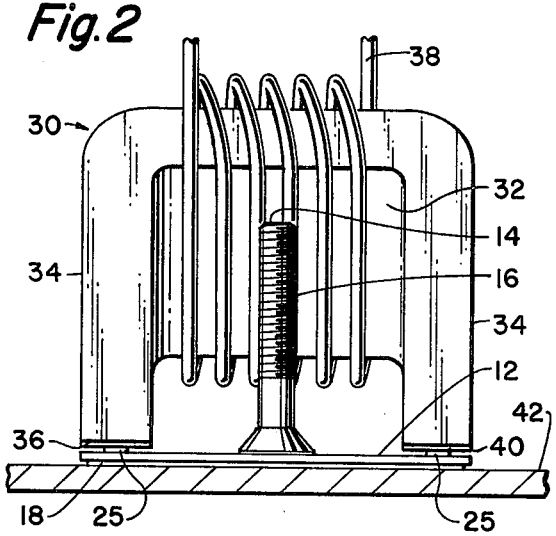
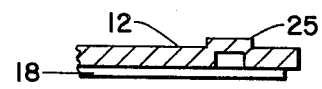
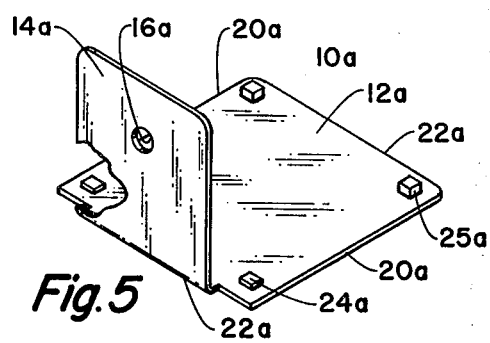
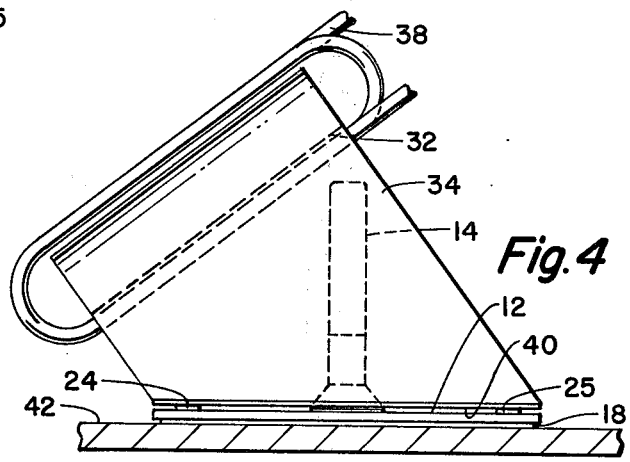
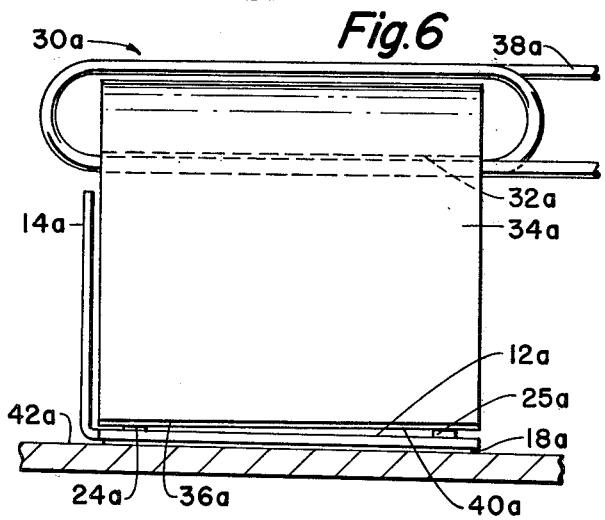
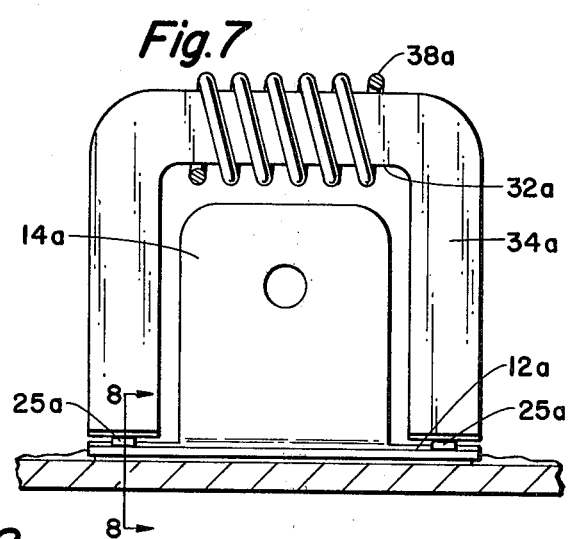
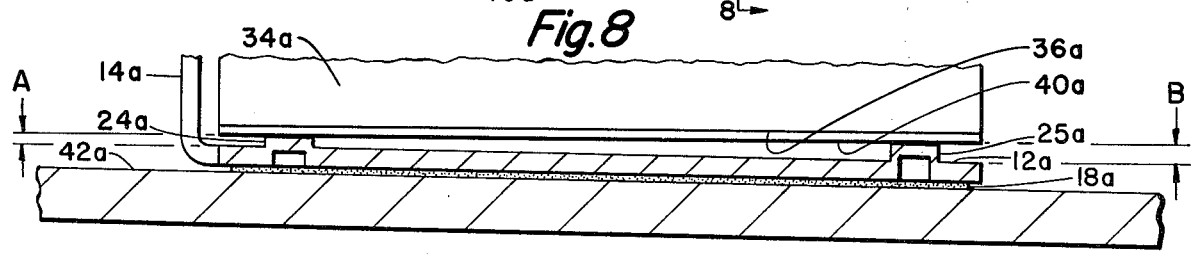

ADHESIVE FASTENER ARTICLE

This invention relates generally to an article adapted to be secured to a support structure by an adhesive layer.

The invention more particularly relates to an article adapted to be secured to a support layer through the use of a U-shaped induction core creating heat in a base which activates adhesive.

The use of a U-shaped induction core to heat metal articles is becoming known in the art. Such a system, for use in adhesive fastening devices is used by placing the end surfaces of the core in abutting contact with laterally spaced surfaces on a ferromagnetic base of the fastener. A magnetic flux circuit is thus created by the bridging of the metal article between the faces of the core. The flux density formed in the metal article heats the base primarily through a hysteresis effect and thus effectively activates the adhesive.

It is very important that the adhesive, in such a system, be heated in a uniform manner or there will be dissimilarities in the bonding strength over the faying surface of the bonded article. A typical limitation of U-shaped heating systems for use in activating adhesive carrying fasteners is that the core itself may become a heat sink by the conduction of heat back into the core as the flat metal base is heated. This will, obviously, reduce the efficiency of the system, increase the time of the heating cycle and quite frequently result in less heat being provided in the regions of the heat sink, creating a dissimilarity in the bonding strength across the adhesive layer. This problem is increased when the article being heated is of an irregular shape which inherently includes a heat sink in its configuration. Since adhesive bonds are weakest when subjected to a peel force, efforts should be taken to strengthen the bond adjacent the perimeter by an adhesive layer.

Accordingly, it is a primary object of the invention to provide an adhesive carrying article which provides a uniform heating pattern to the adhesive layer when associated with a U-shaped induction core.

A further object of the invention is to provide an article that carefully spaces all or most of the surface area of the end surfaces of the legs from conductive contact with the article.

A still further advantage of the invention is to provide a particular adhesive fastening member which will have a uniform heating pattern even when the fastening member is of an irregular shape including a heat sink forming section.

The various objects and advantages of the invention are accomplished by an adhesive fastening device which basically incorporates a flat base with a layer of heat activable adhesive formed on its undersurface. The upper surface of the flat base includes a plurality of protuberances of very limited surface area and height arranged in a pair of laterally spaced lines each being directly adjacent to the extremity of the heat activable adhesive and, therefore, close to the perimeter of the metal article. A more detailed embodiment of the invention includes an upstanding tab at one end of the article and contemplates protuberances of differing and increasing height from a region close to the tab to a region remote from the tab so that end faces of a U-shaped core are spaced from the base a distance which is greater at the region remote from the tab than in the region close to the tab to compensate for the loss of the heat into the tab.

Other objects and advantages will become more apparent during the course of the following description when taken in connection with the accompanying drawings wherein like reference numerals are intended to designate similar elements.

BRIEF DESCRIPTION OF THE DRAWINGS

FIG. 1 is a top plan view of an adhesive fastening device in accordance with the invention.

FIG. 2 is an end elevational view of the fastening device of FIG. 1 shown in association with a U-shaped core.

FIG. 3 is an enlarged cross-sectional view as taken along lines 3—3 of FIG. 1 showing a protuberance forming a part of the invention.

FIG. 4 is a side elevational view of the fastener in combination with a U-shaped core as shown in FIG. 2.

FIG. 5 is a perspective view of an alternate embodiment of the invention showing a device of irregular shape incorporating certain features of the invention.

FIG. 6 is a side elevational view of the invention shown in FIG. 5 in cooperation with a U-shaped induction heating core.

FIG. 7 is an end elevational view of the fastener in combination with a core shown in FIG. 6.

FIG. 8 is an enlarged cross-sectional view of the fastener as taken along lines 8—8 of FIG. 7 and illustrating the protuberance configuration of the invention.

DESCRIPTION OF THE PREFERRED EMBODIMENTS

Referring now to the drawings, reference numeral 10 denotes the fastening device which is the subject matter of the invention and which is designated particularly for use with a U-shaped induction heating core, such as 30.

The device 10 basically includes a substantially flat base 12 and is conventionally provided with an upstanding fastening element, such as threaded stud 14, having threads 16 formed thereon and extending generally perpendicular to the base. This stud is shown to be positioned intermediate the side edges 20 and end edges 22 of the generally rectangular base 12. An adhesive layer 18 is formed beneath the base for association with a primary support surface 42, as more clearly shown in FIGS. 2 and 4.

In operation, the adhesive carrying fastener 10 is effectively heated through operative association with U-shaped core 30. Core 30 will typically include a bridge section 32 and a pair of legs 34 with an exciter coil 38 wound about the bridge. The core may be configured so that the legs are inclined to the fastener base so as to accommodate various lengths of studs 14. End surfaces 36 at the extremities of the legs will be positioned in abutting relationship with the upper surface of the fastener. In such a manner, a magnetic flux circuit is completed between the legs of the core so that the flux density heats the base, primarily through a hysteresis effect. However, as noted earlier, it is important that the adhesive layer be heated uniformly and since the end surfaces 36 of the core directly abut the ferromagnetic base 12, a certain amount of heat is conducted back into the low loss core legs. This situation minimizes the efficiency of the system and increases the time of the heating cycle as well as diluting heat from the regions of the adhesive which are adjacent the side edges 20.

The invention incorporates a pair of lines of protuberances formed in the upper surface of the base 12. Each line should include at least two protuberances 24 and 25.

These lines of protuberances are adapted to be aligned with the end surfaces of an appropriately sized core and are advantageously positioned closely adjacent the side edges 20 of the article. This positionment of the lines of protuberances will be related directly to the side extremities of the adhesive coating. It will be shown in FIG. 3 that these protuberances are of a very limited surface area and height, preferably not exceeding the thickness of the base. Thus, a slight spacing is created between the face of the core and the base to be heated. This slight spacing is not so great as to seriously effect the flux density entering the core but does eliminate the conduction of the heat into the core.

In certain instances, it has been found appropriate to provide the end surfaces of the core with a very thin layer 36 of wear-resistant material which will protect the rather soft magnetically permeable laminations forming the legs of the core.

It will be seen that the use of properly positioned protubernaces on an article to be heated may be varied to accommodate uniquely configured fastening devices which inherently create a heat sink when heat is provided to the base. For example, FIG. 5 shows an L-shaped fastener 10a comprising a generally flat base 12a and an upstanding tab region 14a including an aperture or secondary fastening means 16a. The tab 14a will extend from one end margin 22a of the device. In keeping with the invention, a pair of laterally spaced lines of protuberances are provided in the base 12a closely adjacent the side edges 20a. However, in this embodiment the protuberances 24a closest the tab region are of a smaller height than the protuberances 26a furthest from the tab region. This results in a tilting of the associated core 30a as shown in FIGS. 6 and 7 and in more detail in FIG. 8. For example, protuberance 24a is a distance A above the surface while protuberance 25a is a distance B which is greater than A. These distances are not substantially greater than the thickness of the base and will, thus, not effect the ability of a U-shaped core to sufficiently heat the base.

Thus, it is apparent that the flux density in the region adjacent the tab 14a will be greater than the flux density in the region remote from the tab. The increase in flux density in the tab region thus will accommodate the heat sink situation formed by the tab and will, when carefully calibrated, insure that the adhesive layer 18a is heated uniformly.

In an L-shaped fastener of the type described, uniform heating becomes important since the tab 14a is designed to secure a secondary element to the primary surface through the use of the fastener and its bonding layer. As noted above, since an adhesive bond is relatively weak when loaded in a peeling direction, an inadequate heating of the adhesive in the region of the tab 14a will create an inherently weak joint.

While the invention has been described with particular reference to a preferred embodiment, it will be understood that it is not intended to limit the invention to that embodiment. On the contrary, it is intended to cover all alternatives, modifications and equivalents as may be included within the spirit and scope of the invention and as defined by the appended claims.

I claim:

1. An adhesive fastening device for securing a secondary workpiece to a primary work surface, the device including a platelike base of ferromagnetic material having a substantially uniform, predetermined cross-sectional thickness and carrying a layer of heat activable adhesive on the undersurface thereof, a plurality of protuberance means of limited height and surface area formed upwardly from the base, the protuberance means located in a pair of laterally spaced, parallel lines, each line being closely adjacent to laterally spaced sections of the perimeters of the layer of heat activable adhesive so that a U-shaped inductor core may be positioned over the base with the end surfaces of the legs of the core abutting the laterally spaced lines of protuberances thereby minimizing the heat loss from the device as the device is heated through the completion of a magnetic flux circuit between the legs of the core with the base of the device.

2. The adhesive fastening device in accordance with claim 1, wherein the base is rectangular with the lines of protuberances being located closely adjacent opposing side margins of the rectangular base.

3. The adhesive fastening device in accordance with claim 2, further including a stud secured to the base and located intermediate said opposing side margins all of said protuberances being of equal height.

4. The adhesive fastening device in accordance with claim 2, further including a tab formed upwardly to extend in a plane transverse of the plane of the base, the tab formed on the side margin of the base which interconnects said opposing side margins, at least two protuberances located in each laterally spaced line with each of the protuberances located adjacent the tab associated margin of the base being of less height than each of the protuberances located remote from the tab associated margin.

5. The adhesive fastening device in accordance with claim 1, wherein the protuberances are formed upwardly from the base a distance not substantially greater then the thickness of the base.

6. An adhesive fastening comprising, in combination, the fastening device of claim 1 with a U-shaped core positioned so that the base completes a magnetic flux path circuit between the legs of the core, the end surfaces of the core positioned to abut the pair of laterally spaced lines of protuberances, said end faces being coated with a thin layer of wear resistant material so that said limited surface area protuberances will not harm said end surfaces when the core and device are associated under pressure to secure the device to a primary workpiece.

* * * * *